United States Patent [19]
Gemello et al.

[11] Patent Number: 5,103,488
[45] Date of Patent: Apr. 7, 1992

[54] METHOD OF AND DEVICE FOR MOVING IMAGE CONTOUR RECOGNITION

[75] Inventors: Roberto Gemello; Cataldo Lettera, both of Turin; Lorenzo Masera, Alpignano, all of Italy

[73] Assignee: CSELT Centro Studi e Laboratori Telecommunicazioni SpA, Turin, Italy

[21] Appl. No.: 535,115

[22] Filed: Jun. 7, 1990

[30] Foreign Application Priority Data

Jun. 21, 1989 [IT] Italy .................. 67503 A/89

[51] Int. Cl.$^5$ .................. G06K 9/48; G06K 9/46
[52] U.S. Cl. .................. 382/22; 358/96; 358/136
[58] Field of Search .............. 382/48, 22, 14; 358/85, 358/96, 105, 135, 136, 183

[56] References Cited

U.S. PATENT DOCUMENTS

| | | | |
|---|---|---|---|
| 3,987,243 | 10/1976 | Schwartz | 358/96 |
| 4,466,123 | 8/1984 | Arai et al. | 358/96 |
| 4,546,383 | 10/1985 | Abrrmatic et al. | 358/135 |
| 4,710,813 | 12/1987 | Wallis et al. | 358/136 |
| 4,783,833 | 11/1988 | Kawabata et al. | 382/22 |
| 4,937,878 | 6/1990 | Lo et al. | 382/48 |
| 4,951,140 | 8/1990 | Ueno et al. | 358/136 |
| 4,959,714 | 9/1990 | Lo et al. | 358/105 |

OTHER PUBLICATIONS

L. Westberg, "Pyramid Based Object-Background Segmentation of Dynamic Scenes" Picture Coding Symposium 1988, Torino 12-14 Sep. 1988.

F. Rocca and E. Sada "Structure and Analysis of an Inter-Intra-Frame Television Bandwidth Compressor" Alta Frequenza, vol. XLVII, No. 5 May 1978, pp. 275 E-284 E.

R. O. Duda and P. H. Hart, Wiley, New York, 1973 Chapter 7.3, "Pattern Classification and Scheme Analysis".

International Workshop on 64 KBIT/S Coding of Moving Video, Jun. 14-16, 1988, Hannover, Germany.

*Primary Examiner*—Leo H. Boudreau
*Assistant Examiner*—David Fox
*Attorney, Agent, or Firm*—Herbert Dubno

[57] ABSTRACT

The recognition method is applied to visual telephony image coding. Matrices of digital samples relevant to the individual frames of the video transmission are submitted to a first processing whereby the foreground region containing the figure is identified. The information concerning the elements of such a region is then processed by edge recognition algorithms to detect a group of elements possibly belonging to the contour. The group of elements is analyzed to select a sequence of elements distributed on the average along a line. The sequency of elements is processed by a neural network to build up the continuous contour which is then coded.

13 Claims, 5 Drawing Sheets

METHOD OF AND DEVICE FOR MOVING IMAGE CONTOUR RECOGNITION

FIELD OF THE INVENTION

The present invention relates to image coding systems and, more particularly, it to a method of and a device for moving image contour recognition.

A preferred but non-exclusive application of the invention is the recognition of the contour of the speaker in visual telephony, and hereinafter reference will be made by way of a non-limiting example to that application.

BACKGROUND OF THE INVENTION

It is known that in image signal digital transmission systems it is desired to reduce as much as possible the quantity of information to be transmitted for a given image quality and, to this end, several coding systems allowing image redundancy reduction have been investigated.

The most promising technique at low bit rates has been considered so far to be the so-called hybrid coding, which is a combination of transform coding and of differential coding and exploits both spatial and temporal image correlations. However, it appears that the upper performance limits of this technique have been substantially reached, and hence studies are being performed to detect new techniques allowing enhancement of the quality of low bit rate coded images, and, more particularly, techniques based on a certain degree of knowledge of the image to be coded and/or transmitted.

In the particular case of visual telephony, the coding process can take advantage of the fact that the background remains practically unchanged while the speaker figure changes. Therefore, it is possible to transmit and store in the receiver once coding for all the information relevant to the background, while at each frame only the information relevant to the speaker figure will be coded and/or transmitted.

A method of processing videotelephone images allowing the separation of the speaker figure from the background has been described by L. Westberg in the paper entitled "Pyramid based object-background segmentation of dynamic scenes", Picture Coding Symposium 1988, Torino, 12-14 September 1988. According to this known method, the image is split into blocks of elements, the differences between corresponding blocks in successive frames are determined, such differences are compared with a threshold and the blocks are classified as belonging to the background or to the object depending on whether the difference is or is not below the threshold. The operations are repeated with blocks of smaller and smaller size, yet composed of a two-dimensional matrix of elements. The blocks belonging to the object are then supplied to downstream processing devices, e.g. coding units.

This method allows detection of a region presumably comprising the object border, which region consists of the blocks which were classified neither as background nor as object; operating on blocks of elements does not allow detection of the object contour line.

OBJECT OF THE INVENTION

It is an object of the present invention to provide a method and a device allowing the exact detection of a contour line, and not only of the region comprising such a line.

SUMMARY OF THE INVENTION

The method of identifying the contour of moving figures, wherein such figures are part of a sequence of images each converted into a matrix of digital signals forming a frame, comprises the following steps:

- comparison between a current frame and a preceding frame to distinguish changed image regions, forming a foreground containing the figure whose contour is to be recognized, and unchanged image regions, forming a background, and building up and storage of an inter-frame map comprising foreground image elements;
- application of an edge recognition algorithm to the foreground region of the current frame to identify image elements candidate to belong to the figure contour, and building up and storing an intra-frame map comprising such candidate elements;
- logic sum of the inter-frame and intra-frame maps, to build up a single map of elements, and scanning such a single map horizontally, vertically and obliquely, each scanning step identifying an element of a possible linear contour of average unitary width;
- vectorial quantization of the elements of said linear contour with a neural network; and
- generation of a continuous contour passing through the representative points obtained by the quantization.

A device apt to perform the method comprises:

- means for comparing successive frames of samples and for providing a two-dimensional bit matrix, in a one-to-one correspondence with image elements, wherein the logic value of each bit indicates whether the corresponding element belongs to a background or a foreground region, the foreground region comprising the moving figure;
- means for detecting, among the samples in a frame, those corresponding to elements candidate to belong to the moving figure contour;
- means for selecting, among the candidate elements, elements substantially placed along a line, so as to build a discontinuous contour having an average width equal to an image element; and
- a neural network to obtain from the discontinuous contour, by successive approximations, a continuous line representing the figure contour.

Advantageously, the neural network is a topological self-organizing map, namely a Kohonen map, and vector quantization and continuous contour generation are obtained as results of a self-training step of the network. That step is repeated for each image of the sequence and, during the training step relevant to an image, the map is caused to converge through successive approximations towards the image contour starting from an initial configuration determined in an initialization phase.

BRIEF DESCRIPTION OF THE DRAWING

The above and other objects, features and advantages of our invention will become more readily apparent from the following description, reference being made to the accompanying highly diagrammatic drawing in which:

FIG. 6 is a flow chart of the operations concerning the formation of the continuous contour.

SPECIFIC DESCRIPTION

In the following description, reference is made to the preferred application to videotelephone image transmission and coding. Generally, such images comprise a fixed part (background) and a variable part (foreground, i.e. the speaker figure) forming the moving figure whose contour is to be identified.

The method comprises two main phases: the first comprises the operations necessary to select a series of points or image elements which generally belong to the contour looked for; the second is the generation of a continuous contour starting from such points. The actual contour coding follows.

Figure 1:
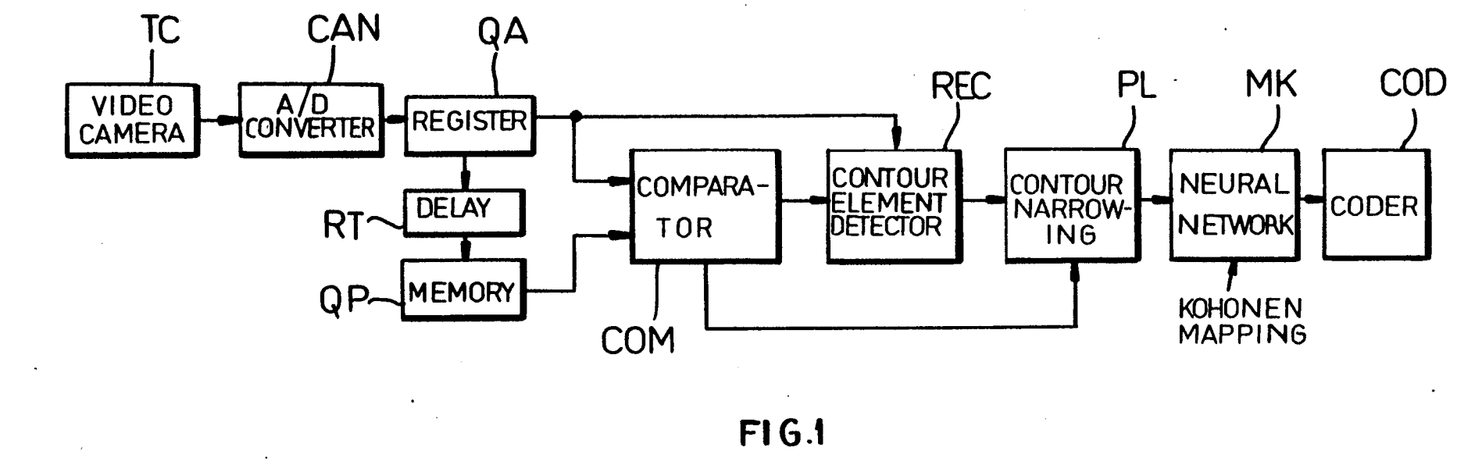
FIG. 1 is a functional block diagram of a device for carrying out the method of the invention.

To this aim, the images supplied by a TV camera TC (FIG. 1) are converted into digital form by an analog-to-digital converter CAN giving rise to a set of matrices of samples, each corresponding to a TV frame; the sample values are e.g. luminance values, coded by a suitable number of bits (e.g. 8 bit per sample). Then, the region in which the speaker figure lies is to be detected. This operation exploits the fact that the speaker figure can change passing from a frame to the next, while the background remains unchanged. To detect the position of the image elements belonging to the speaker figure (i.e. of the changed elements) a comparison is to be made between a current frame, kept available at the input of the processing devices through a register QA, and a preceding frame, delayed by a time T (e.g. a frame time), in a delay element RT and stored in a memory QP. The comparison means are denoted by block COM.

Advantageously, block COM comprises two groups of comparison devices. The first can operate by applying the Viterbi algorithm, as described by F. Rocca and E. Sada in "Structure and analysis of an inter-intra-frame television bandwidth compressor", Alta Frequenza, Vol. XLVIII, No. 5, May 1978, pages 275E-284E. The second group can on the contrary evaluate the luminance difference between individual image elements and compare it with a threshold.

Thus each of the two groups of devices subdivides a frame into two parts (background and foreground regions): that subdivision results in a matrix, whose elements correspond to the image elements in a frame and have different logic values according to whether they belong to the foreground or the background. The regions identified as changed regions by the two groups of devices are then ORed to build an inter-frame map. It is worth noting that, to be surer of the validity of the comparison results, at least when operating with the Viterbi algorithm, the region occupied by the speaker may be assumed to be a predetermined fraction of the whole image (e.g. ⅓): thus, if the region identified does not meet that criterion, the comparison is repeated with a frame having a greater time distance from the current one. The result of the operations of block COM, applied to a standard test figure, is shown in FIG. 2.

The matrix built up by block COM (FIG. 1) is supplied to a unit REC, which receives also the samples of the current frame and processes the input signals in order to recognize, among the image elements in the foreground within a frame, those which are candidate to be elements belonging to the contour. Algorithms are known in the art allowing identification of elements belonging to the contour of an image, by exploiting the fact that in correspondence with intensity changes there is a peak in the first derivative and a zero crossing in the second derivative of the intensity as a function of the direction. An algorithm succesfully applied in the case being investigated is the so-called Sobel algorithm described 'Pattern classification and scene analysis', by R. O. Duda and P. H. Hart, Wiley, N.Y., 1973, chapter 7.3.

Figure 2:
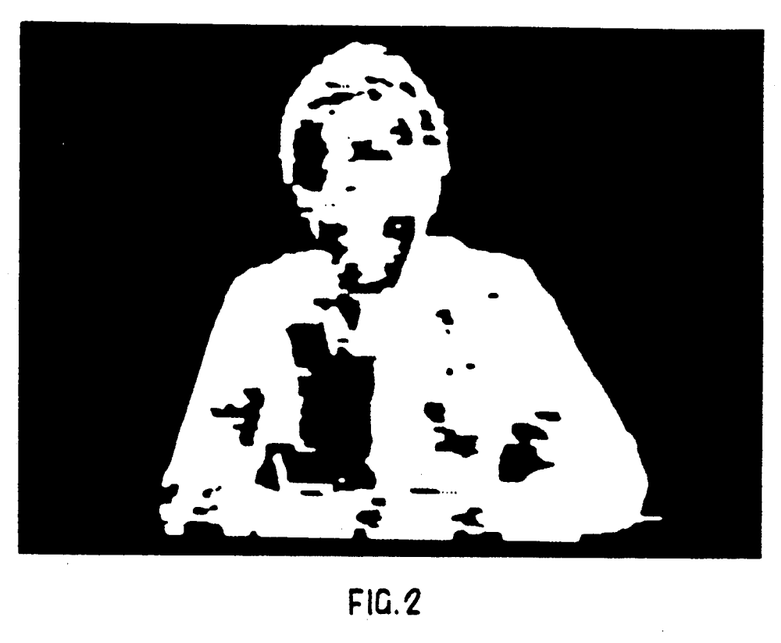
FIGS. 2-5 depict the results of some steps of the method applied to real images.
Figure 3:
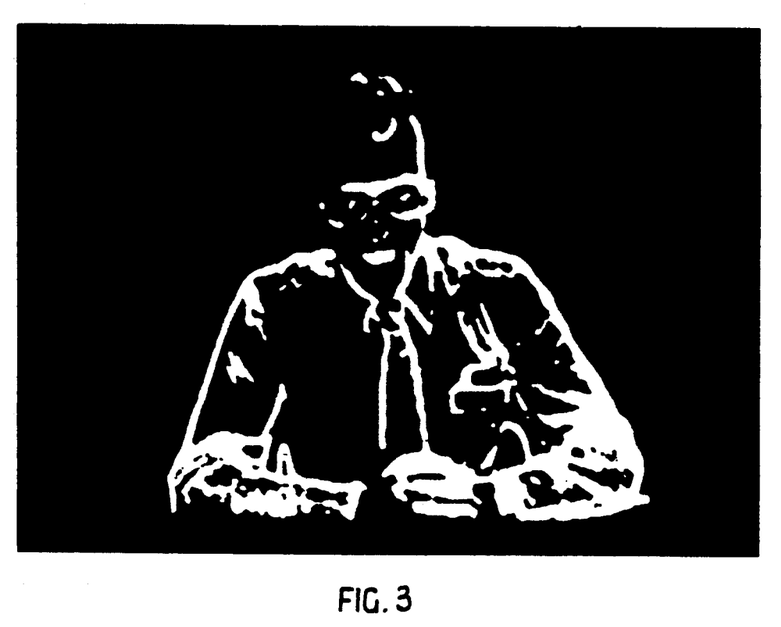
Figure 4:
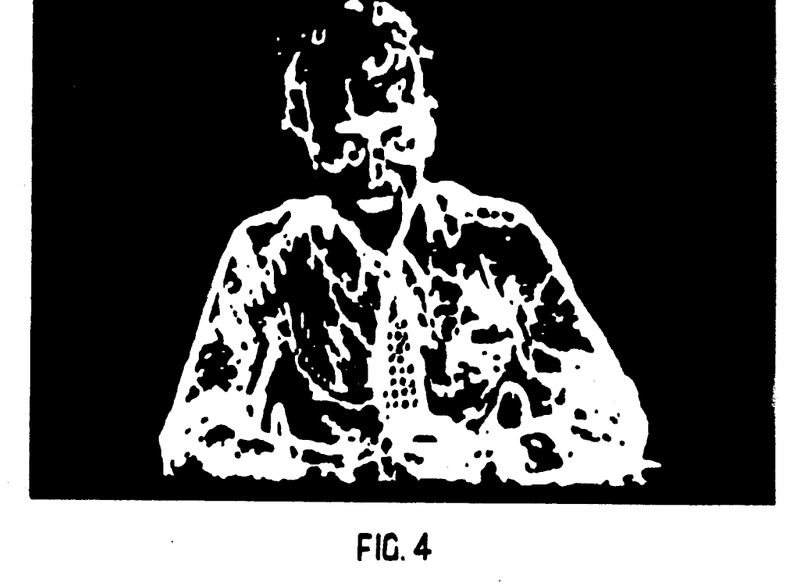

The result of processing the image of FIG. 2 by the Sobel algorithm is shown in FIG. 3. As shown, in some zones the contour (bright regions) is rather well defined, while in others it has many gaps, chiefly owing to insufficient contrast in the frame. An improvement can be achieved by exploiting the knowledge of the luminance values of the background points: more particularly all points belonging to the foreground and being adjacent to points having a luminance value equal to one of the background values can be searched for. In other words, among the points detected in the foreground (inter-frame map) only those having a luminance value different from the background points are maintained. The means creating a hystogram of background brightness values and comparing with such values the brightness of the candidate elements are incorporated for sake of simplicity into block RIC. The result of this further processing is shown in FIG. 4.

As shown, by the operations carried out up to that instant a set of points distributed over the whole foreground region has been obtained. This set of points corresponds to a second binary matrix (intra-frame map).

The intra-frame and inter-frame maps obtained are supplied by blocks COM and REC (FIG. 1) to a block PL which carries out the operations necessary to obtain a contour whose width is reduced to a single image element (linear contour). To obtain that contour, intra-frame and inter-frame maps are ORed and the resulting map is horizontally, vertically and obliquely scanned back and forth: an image element in the contour is the first point of the intra-frame map found by the scanning in one direction or, if none are found, the first inter-frame map point. Besides, for each point identified in this way a validity check is carried out. In practice, since the approximate form of the figure contour is known a priori, isolated points or groups of points, which no doubt are outside the contour itself, can be neglected. The result is shown in FIG. 5.

Figure 5:
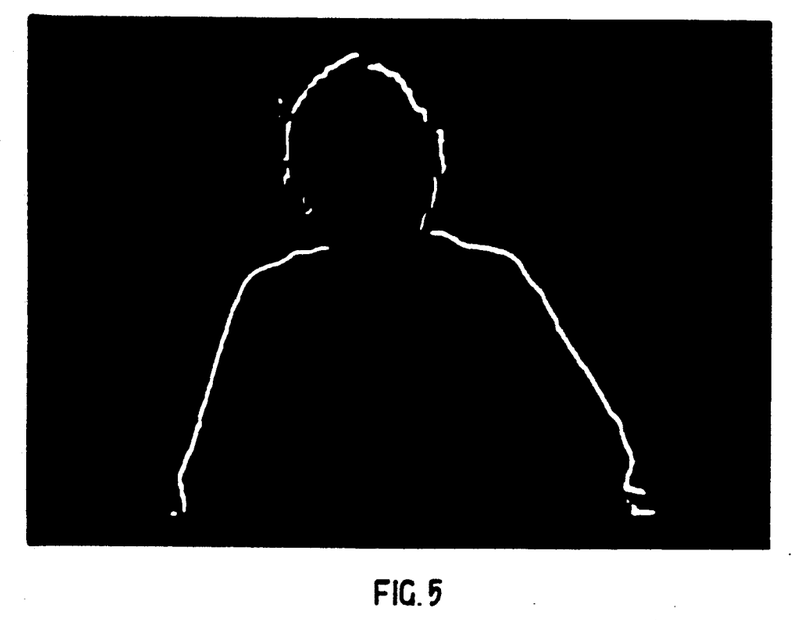
Figure 7:
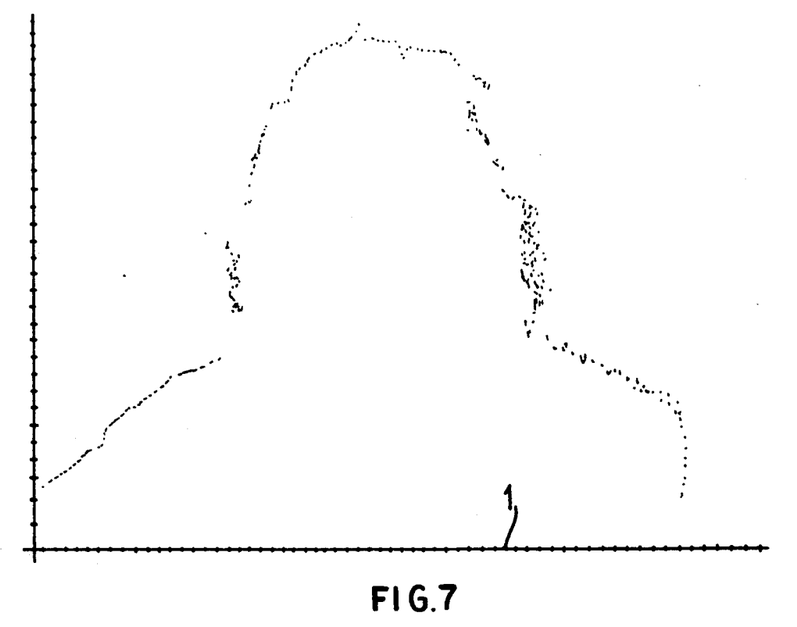
FIGS. 7-10 are simplified drawings illustrating some steps of the operations of FIG. 6.

The nearly continuous line shown in FIG. 5 is actually a discontinuous sequence (or 'cloud') of points, which gather around the contour line looked for. This fact is better seen in FIG. 7, reproducing a contour which is rather simplified if compared to that of FIG. 5, but which is useful for understanding the successive processing steps. The processings on the point cloud are carried out by a neural network MK (FIG. 1) and more particularly by a so-called topological self-organizing map (Kohonen map) which creates the desired continuous line. The operations of block MK are shown in more detail in the flow chart of FIG. 6 and will be hereinafter illustrated with reference to the schematical representations of FIGS. 7-10. The output of black MK is fed to the coder COD.

Neural networks are processing systems whose structure reproduces the human brain organization in a highly simplified form. In fact, they are based on a high parallelism of simple and highly interconnected elements (corresponding to neurons, i.e. basic brain cells), wherein the processing is stimulated by input data and propagates in parallel to the outputs. It could be said that the inputs modify the internal network condition, i.e. the network "responds" to external stimuli. Each element responds differently to the inputs and the closer the element to the input, the higher the response intensity. Specifically, the information supplied to each element is evaluated with different weights. The set of inputs and the set of weights by which each network element evaluates the inputs can also be compared to vectors. The element output is a function of the scalar product between the two vectors or, in other words, the "neuron" activation level depends on vector similarity.

Self-organizing maps or Kohonen maps are a class of neural networks capable of self-organizing to classify unclassified input data or examples (vectors of real numbers). This self-organization is in practice the result of a training phase. Once that phase is over, the network can classify new unknown examples, determining the appurtenance to one of the classes the network has defined thanks to the self-training. The network consists of an array of interconnected units or nodes (neurons) representing the centroids of the classes. Input points or nodes are completely connected to the network nodes. For each output node also a geometric distance from the other nodes is defined. For the training step, the weights by which each input datum is connected to each node are initialized at low values. Then, for each input vector, the distance is calculated between said vector and the weight vector associated with each network node. The distance defined above is a vectorial distance, which gives indication of the input-to-node similarity. Then the node with minimum distance from the input considered is chosen and the weights of the nodes which lie within a predetermined radius from the node chosen (neighborhood) are modified in a manner depending on the topological distance: i.e. the weight of the node which is the closest to the chosen node is strongly modified, and the others are less modified and in decreasing extent as the distance increases. The same operation is iterated a certain number of times (epochs) until a stable result is reached, i.e. a minimum of the average of vectorial distance of the examples from the closest centroids.

In the application considered, the map is used in a peculiar way, since the classification achieves the contour identification and hence shall be repeated for each image. The map operations are then limited to the self-training phase. The inputs are vectors in a two-dimensional space, and their components are the coordinates of the points of the cloud generated at the end of the first phase of the method. The idea of using a Kohonen map to generate the speaker image contour has been suggested by the fact that the maps easily adapt themselves to the input data so as to minimize the mean square distance of the data from the network nodes. The use of a map of this type corresponds to a vectorial quantization of the input data, whereby the cloud of points is converted into a reduced and predetermined number of representative points.

More particularly, in the example depicted in FIGS. 7-10, the network has a single line and as many columns as are the desired representative points (60 in the Figures). The weight initialization, at least for a first image, has been made so that the nodes lie on a horizontal straight line at the base of the speaker figure (straight line 1 in FIG. 7), the extreme nodes being in correspondence with the detected points with minimum and maximum abscissa. Considering straight line 1 as the abscissa axis, the initialization carried out results in one a component of all weights being null, whilst the other is the node abscissa.

Initial neighborhood radius has been set to 15, and is caused to decrease according to the 15, 10, 5, 3, 2, 1 scale, each value being maintained e.g. for a certain number of epochs.

For each point Pi of the first image the vectorial distance dj from each network node Nj is calculated according to relation $$\sum_{i=0}^{l-1}(pi - wij)^2 \qquad (1)$$

where pi are the components of the vector identifying point Pi, l is the number of such components (2 in the considered case) and wij are the components of the weight vector of node Nj. For this first series of computations the weights determined in the initialization phase are used. In the successive iterations the processing starts from the values as modified up to that instant.

As mentioned, the components of both the input vectors and the weight vectors are the Cartesian coordinates of the cloud points and of the nodes respectively. Vector distance dj is under these conditions the square of the geometric distance between the point and the node.

Once node Nj* being the closest node to each input point has been detected, the weights of such a node and of all those comprised in the neighborhood are modified according to relation $$\Delta wij = \eta(t) \cdot a(j,j^*) \cdot (pi - wij) \qquad (2)$$

The nodes whose weights are modified are as far as possible symmetrically arranged at both sides of node Nj*. Coefficient $\eta$ is an incrementation coefficient decreasing with time whilst $a(j,j^*)$ is a coefficient varying with the distance between node Nj and node Nj*. More particularly in the present case the initial value $\eta$ (0) was 0.1, while each successive value $\eta$ (t+1) has been obtained from the preceding one (t) with a law of the type:

$$\eta(t+1) = MAX[0.025; \eta(t) \cdot 0.95] \qquad (3)$$

and values $a(j,j^*)$ were chosen according to relation $$a(j,j^*) = \exp(-X^2/(1.2 \cdot V1/t)) \qquad (4)$$

where X is the distance between node Nj and node Nj*, V1 is the number of nodes (60 in the example), and t is the time (i.e. the number of epochs).

Figure 8:
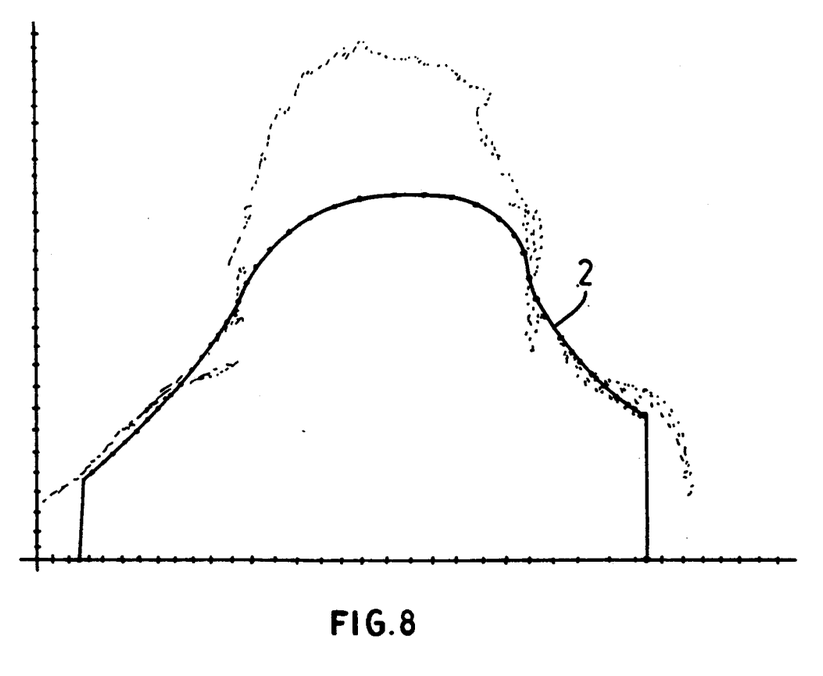
Figure 9:
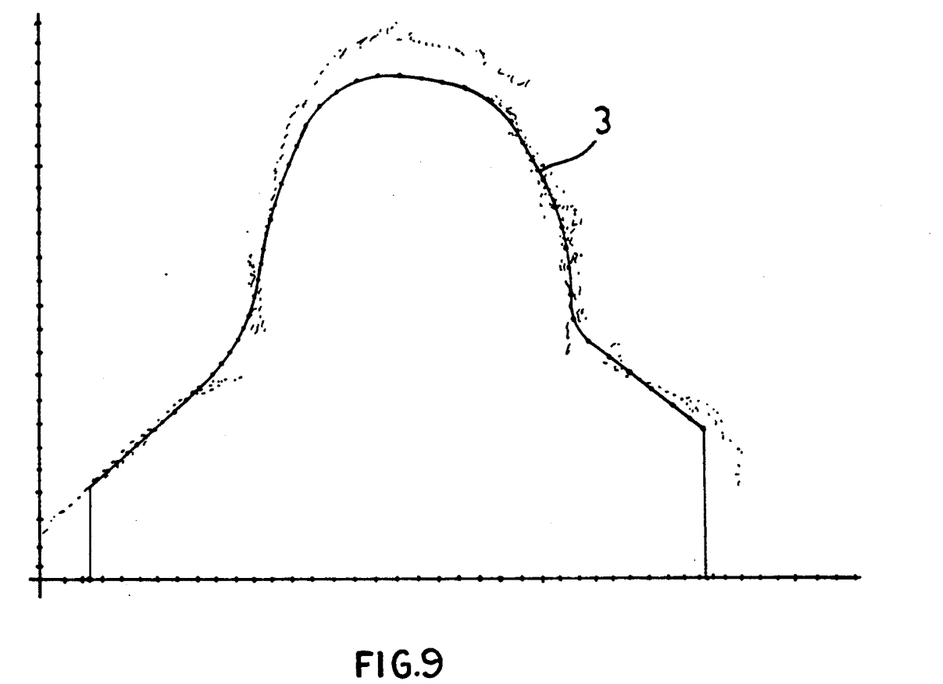
Figure 10:
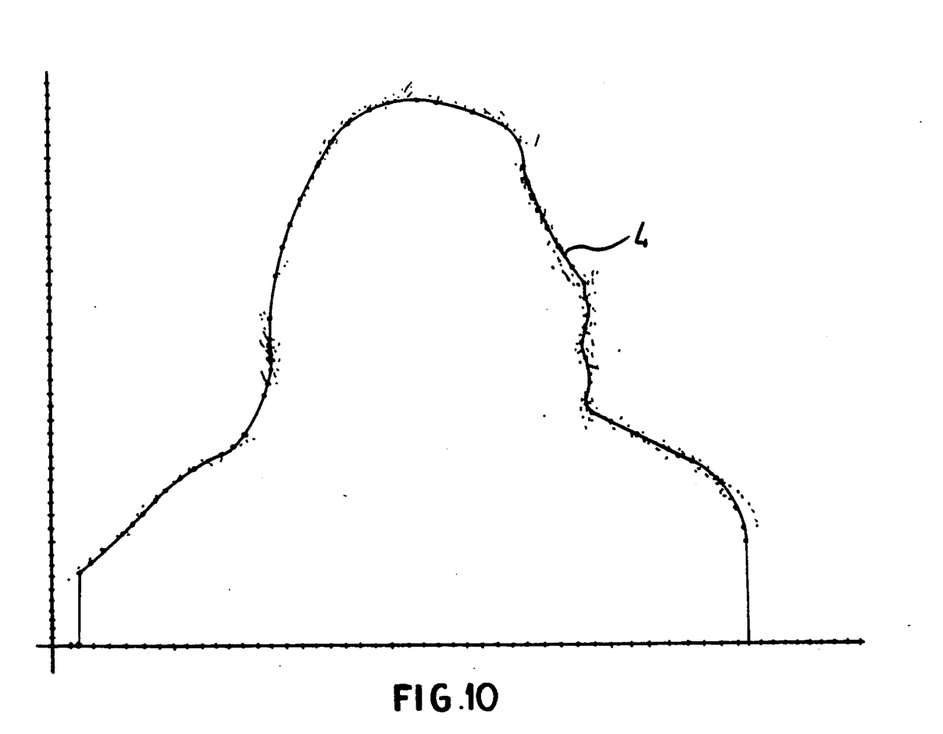

As an effect of the weight modification, at the end of the first epoch the map is no longer rectilinear and assumes the configuration denoted by 2 in FIG. 8.

Now the described operations are repeated, by sequentially computing for each input point the distance from the nodes and modifying again the weights at each step, using e.g. the same radius of neighbourhood as in the first epoch and new coefficients, determined according to (2) and (3). At the end of the second epoch the network has the shape denoted by 3 in FIG. 9. The operations carried out are further iterated, by periodically changing the neighbourhood radius, till the mean distance between the input points and the closest node decreases below a predetermined threshold. In the example considered, the threshold is reached at the sixteenth iteration (FIG. 10), when the map has the configuration denoted by 4, which very well approximates the actual contour.

The operations are then repeated for the subsequent frame. Yet advantageously for the subsequent frames the map is no longer initialized by a straight line, but the initial configuration can be the configuration obtained at the end of the processings relevant to the preceding frame. Owing to the relatively limited variability of the images to be processed, in this way the contour looked for can be reached more quickly.

The contour will be then coded by one of the techniques usually used in this domain.

It is clear that what described is given only by way of a non limiting example and that variations and modifications are possible without going out of the scope of the invention, more particularly in respect of the image processing algorithms and the laws used to update the neural network. By way of example, an alternative law for updating the weights is obtained by assuming $\eta(t)$=constant (e.g. 0.1) and $a(j,j^*)$=exp $(-X^2/T^2)$ where $T(t+1)=\alpha T(t)$, with $T(0)=15$, $\alpha=0.7$.

We claim:

1. A method of recognizing the contour of a moving figure forming part of a sequence of images each of which is converted into a matrix of digital signals corresponding to a frame, the method comprising the steps of:
   (a) comparing a current frame and a preceding frame to distinguish changed image regions, thereby forming a foreground containing the figure whose contour is to be recognized, and unchanged image regions forming a background, and building up and storing an inter-frame map comprising foreground image elements;
   (b) applying an edge recognition algorithm to the foreground region of the current frame to identify image elements which are candidates for the figure contour, and building up and storing an intra-frame map comprising such candidate elements;
   (c) forming a logic sum of the inter-frame and intra-frame maps to build up a single map of elements, and scanning such a single map horizontally, vertically and obliquely in scanning steps, each scanning step identifying an element of a possible linear contour of an average unitary width;
   (d) vectorially quantizing the elements of said possible linear contour with a neural network to generate respective contour points; and
   (e) generating a continuous contour passing through the points obtained by the quantization.

2. The method defined in claim 1 wherein the comparing in step (a) is carried out according to two different techniques, one effecting a comparison of corresponding lines in said frames according to an algorithm of minimization of an error function and the second an evaluation of the brightness difference of corresponding image elements, each comparison producing a respective inter-frame map, said inter-frame maps being logically added together.

3. The method defined in claim 1 wherein said intra-frame map building step (b) further comprises identifying all foreground elements having a brightness value different from the brightness values present in the background and adding elements thus identical to those detected as a result of the application of the edge detection algorithm.

4. A method of recognizing the contour of a moving figure forming part of a sequence of images each of which is converted into a matrix of digital signals corresponding to a frame, the method comprising the steps of:
   (a) comparing a current frame and a preceding frame to distinguish changed image regions, thereby forming a foreground containing the figure whose contour is to be recognized, and unchanged image regions forming a background, and building up and storing an inter-frame map comprising foreground image elements;
   (b) applying an edge recognition algorithm to the foreground region of the current frame to identify image elements which are candidates for the figure contour, and building up and storing an intra-frame map comprising such candidate elements;
   (c) forming a logic sum of the inter-frame and intra-frame maps to build up a single map of elements, and scanning such a sngle map horizontally, vertically and obliquely in scanning steps, each scanning step identifying an element of a possible linear contour of an average unitary width;
   (d) vectorially quantizing the elements of said possible linear contour with a neural network to generate respective contour points; and
   (e) generating a continuous contour passing through the points obtained by the quantization, said neural network forming a self-organizing topological map, and vector quantization and continuous contour generation are obtained as a result of a network self-training step, which is repeated for each image in the sequence and during which the self-organizing topological map is caused to converge through successive approximations towards the image contour starting from an initial configuration determined in an initialization phase.

5. The method defined in claim 4 wherein said images are relevant to successive frames of the television image transmission in visual telephony, and the moving figure is the speaker figure.

6. The method defined in claim 4 wherein for said self-training the network is initialized so that said points are uniformly distributed in projection on a straight line located at a base of the figure whose contour is to be identified, the extreme representative points being chosen so that the projections on the straight line of all points in the linear contour lie within a segment defined by such extreme points.

7. The method defined in claim 6 wherein an initialization by a straight line is performed for a first image of the sequence, while for the following images an initial map configuration consists of the contour obtained for a preceding image.

8. The method defined in claim 1 as a phase in a method of coding image signals organized in frames, where only the moving image contour is coded at each frame, while the background is coded once for all frames of the moving image contour.

9. An apparatus for recognizing a moving image contour, comprising:
   means for converting an image containing a moving figure into a digital sample matrix in the form of a frame; and means for presenting to a processor device, at each frame time, both a current frame and a preceding frame, said processor device comprising:

comparing means for comparing successive frames of samples and for providing a two-dimensional bit matrix, in a one-to-one correspondence with image elements, wherein a logic value of each bit indicates whether the corresponding element belongs to a background or a foreground region, the foreground region comprising the moving figure;

detecting means connected to said comparing means for detecting, among samples in each frame, those corresponding to elements which are candidates for the moving figure contour;

selecting means connected to said detecting means for selecting, among the candidate elements, elements substantially placed along a line, so as to build a discontinuous contour having an average width equal to an image element; and a neural network connected to said selecting means to obtain from the discontinuous contour, by successive approximations, a continuous line representing the figure contour.

10. The apparatus defined in claim 9 wherein said comparing means comprises means for comparing the two frames according to different criteria, and means for combining into a single matrix, respective matrices from the different criteria.

11. The apparatus defined in claim 9 wherein said detecting means comprises means for identifying a first set of image elements by evaluating the contrast within said foreground region during a frame, and means for comparing the brightness of the foreground and background elements and for supplying said selecting means with a second set of image elements, comprising elements having a different brightness from that of the background, said first and second set forming the set of candidate elements.

12. The apparatus defined in claim 9 wherein said selecting means comprise means for combining the set of candidate elements and the elements belonging to the foreground region to form a single set of elements, means for scanning the elements of said single set of elements, and means for choosing as discontinuous contour elements a first element of the single set found during each scanning step.

13. The apparatus defined in claim 9 wherein the means forming the matrices receive the images from a TV camera of a videotelephone system, and said processor device recognizes the contour of the speaker and supplies the identified contour devices coding the image signal.

* * * * *